United States Patent
Kim et al.

(10) Patent No.: US 10,561,991 B2
(45) Date of Patent: Feb. 18, 2020

(54) HOMOGENEOUS ANION-EXCHANGE COMPOSITE MEMBRANE HAVING EXCELLENT CHEMICAL RESISTANCE AND METHOD FOR PRODUCING THE SAME

(71) Applicant: Korea Research Institute of Chemical Technology, Daejeon (KR)

(72) Inventors: Jeong Hoon Kim, Daejeon (KR); Bong Jun Chang, Daejeon (KR); Su Young Moon, Uijeongbu-si (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 133 days.

(21) Appl. No.: 15/976,437

(22) Filed: May 10, 2018

(65) Prior Publication Data

US 2018/0326364 A1  Nov. 15, 2018

(30) Foreign Application Priority Data

May 10, 2017  (KR) .................. 10-2017-0057936

(51) Int. Cl.

| B01D 69/12 | (2006.01) |
|---|---|
| B01D 67/00 | (2006.01) |
| B01D 69/02 | (2006.01) |
| B01D 69/10 | (2006.01) |
| B01D 71/82 | (2006.01) |
| B01D 71/68 | (2006.01) |
| B01D 71/26 | (2006.01) |
| B01D 71/30 | (2006.01) |
| B01D 71/76 | (2006.01) |

(52) U.S. Cl.
CPC ....... B01D 69/125 (2013.01); B01D 67/0006 (2013.01); B01D 67/0093 (2013.01); B01D 69/02 (2013.01); B01D 69/10 (2013.01); B01D 71/68 (2013.01); B01D 71/82 (2013.01); B01D 71/26 (2013.01); B01D 71/30 (2013.01); B01D 71/76 (2013.01); B01D 2323/30 (2013.01); B01D 2323/40 (2013.01); B01D 2323/46 (2013.01); B01D 2325/16 (2013.01); B01D 2325/42 (2013.01)

(58) Field of Classification Search
CPC ...... B01D 69/125; B01D 69/02; B01D 69/10; B01D 67/0006; B01D 67/0093; B01D 71/68; B01D 71/82; B01D 71/26; B01D 71/30; B01D 71/76; B01D 2323/30; B01D 2323/40; B01D 2323/46; B01D 2325/42; B01D 2325/16

USPC ......................................... 521/27
See application file for complete search history.

(56) References Cited

FOREIGN PATENT DOCUMENTS

| KR | 10-0542295 B1 | 1/2006 |  |
|---|---|---|---|
| KR | 100542295 B1 * | 1/2006 |  |
| KR | 10-0999048 B1 | 12/2010 |  |
| KR | 100999048 B1 * | 12/2010 | ............ C08J 5/2275 |
| KR | 10-1681637 B1 | 12/2016 |  |
| KR | 101681637 B1 * | 12/2016 |  |
| KR | 10-1726658 B1 | 4/2017 |  |
| KR | 101726658 B1 * | 4/2017 |  |

OTHER PUBLICATIONS

Yukio Mizutani , Journal of Membrane Science, 1990, 49: 121-144.
Shi and Holdcroft, Macromolecule, 2005, 38: 4193-4201.
Srivastava et al., Applied Sciences, 2016, 6: 159.

* cited by examiner

*Primary Examiner* — Michael Bernshteyn
(74) *Attorney, Agent, or Firm* — Leydig, Voit & Mayer, Ltd.

(57) ABSTRACT

The present invention provides a anion-exchange composite membrane comprising a copolymer containing a vinylbenzyl trialkylammonium salt repeating unit, a styrene repeating unit and a divinylbenzene derived repeating unit; an olefin additive; a plasticizer; and a polyvinyl halide polymer. The anion-exchange composite membrane comprising a copolymer containing a vinylbenzyl trialkylammonium salt repeating unit, a styrene repeating unit and a divinylbenzene derived repeating unit; an olefin additive; a plasticizer; and polyvinylidene fluoride of the present invention not only displays low electrical resistance, excellent ion exchange capability, excellent ionic conductivity, excellent mechanical properties, excellent chemical properties, and processability, but also is easy to regulate its ion exchange capacity and ionic conductivity. Also, the composite membrane of the invention is easier to produce and cheaper to manufacture than the conventional anion-exchange composite membrane.

16 Claims, 1 Drawing Sheet

Impregnating a support in the form of a fabric in a polymerization solution comprising a vinylbenzyl halogen monomer, a styrene monomer, a divinylbenzene crosslinking agent, an initiator, an olefin additive, a plasticizer and a polyvinyl halide polymer (step 1)  S100

Preparing a copolymer composite membrane containing a vinylbenzyl halogen-styrene copolymer produced by polymerizing the vinylbenzyl halogen monomer, the styrene monomer, and the divinylbenzene crosslinking agent included in the support impregnated in step 1; the olefin additive; the plasticizer; and the polyvinyl halide polymer (step 2)  S200

Preparing an anion-exchange composite membrane by reacting the copolymer composite membrane of step 2 with a tertiary amine and introducing a quaternary ammonium group as an anion-exchangeable group (step 3)  S300

HOMOGENEOUS ANION-EXCHANGE COMPOSITE MEMBRANE HAVING EXCELLENT CHEMICAL RESISTANCE AND METHOD FOR PRODUCING THE SAME

CROSS-REFERENCE TO RELATED APPLICATIONS

This application claims priority under 35 USC 119(a) to Korean Application No. 10-2017-0057936, filed May 10, 2017, which is hereby incorporated by reference in its entirety.

BACKGROUND OF THE INVENTION

1. Field of the Invention

The present invention relates to a vinylbenzyl-styrene anion-exchange composite membrane containing a polyvinyl halide polymer, and a preparation method of the same.

2. Description of the Related Art

An ion-exchange membrane is a kind of a polymeric membrane. Depending on the type of an ion-exchangeable group introduced into the membrane, anions or cations can be selectively separated by electrostatic principle. A commercial cation-exchange membrane contains a strong acidic sulfonic acid group ($-SO_3^-$) and a weak acidic carboxylic acid group ($-COO^-$) as an ion-exchangeable group, while an anion-exchange membrane has a strong basic quaternary ammonium group ($-NH^{3+}$) mostly as an ion-exchangeable group.

The separation process using the ion-exchange membrane facilitates high purity separation/purification with less energy consumption and requires low equipment investment cost because the required device is simple, compared with the conventional separation method based on distillation or chemical treatment. It also facilitates a continuous process, suggesting that the processing ability per hour is excellent, because of which it draws our attention as a promising separation/purification process in various industrial fields.

Currently, the ion-exchange membrane is used in various industrial fields such as electrodialysis for desalting or purifying for the removal of harmful heavy metals or other toxic ionic substances, water-splitting electrodialysis, diffusion dialysis for acid recovery from acidic waste water, and electrodeionization for the production of ultrapure water for semiconductor or power generation through desalting of seawater or surface water. The application fields are continuously expanding. In general, a commercial membrane has to have high ion selective permeability (>0.95-0.98), low electrical resistance (<3.0-4.0 $\Omega/cm^2$), adequate water content, high mechanical strength and chemical resistance.

The conventional ion-exchange membrane is prepared by the copolymerization using a vinylbenzyl monomer and a divinylbenzene monomer as basic materials via a bulk polymerization method, a latex method, and a paste method.

The bulk polymerization is a method in which an initiator is added to a monomer for polymerization without using a solvent. When the bulk polymerization is performed by using the vinylbenzene-divinylbenzene monomer alone, the brittleness is increased and the mechanical properties are lowered. Therefore, a support capable of reinforcing the mechanical strength has to be used. Furthermore, since a certain container is required to obtain a thin film, there is a problem that the manufacturing cost of the entire membrane is increased.

The latex method is a method in which a vinylbenzyl-divinylbenzene copolymer or a vinylbenzyl-butadiene copolymer latex is immersed in a support and dried, followed by crosslinking by oxidation crosslinkage to form a base film, and then sulfonation, chloromethylation, or quaternary amination is induced on the basic film in order to introduce an ion-exchangeable group. However, the latex method has problems of reducing mechanical properties and electrochemical characteristics of the membrane due to the affect of the emulsifier remaining in the latex included in the polymer.

In the meantime, the paste method is a method in which a paste is prepared by using a vinylbenzyl-divinylbenzene monomer, a copolymer powder thereof, a rubber additive, etc., and then the prepared paste is layered on a support like thin clothes, and the temperature of which is raised to produce the membrane. In that case, the mechanical and electrochemical properties of the membrane are superior to those of the membrane produced by the bulk polymerization or the latex method above. To improve the mechanical properties, an additive has to be added, which makes the process more complicated. Such complexity of the process is a reason of the increase of the production cost. Besides, the membrane can be easily broken during the drying process and the chemical stability can be reduced (Y. Mizutani, Structure of ion-exchange membranes, J. Member. Sci. 49 (1990) 121).

Korean Patent No. 10-0542295 describes a method to prepare an anion-exchange membrane, wherein vinylbenzyl chloride, a swelling-promoting monomer, divinylbenzene and a photoinitiator are absorbed by using a nonporous low-density polyethylene film as a support displaying the monomer absorbability and the photo-crosslinking properties at the same time, which is irradiated with UV for polymerization, and then quaternary amination is induced to introduce an anion-exchangeable group to prepare an anion-exchange membrane. However, the ion-exchange membrane prepared by the method above is hard to be commercialized because the strength of the support itself is too low and the brittleness is too high after the introduction of the ion-exchangeable group.

Korean Patent No. 10-0999048 describes an anion-exchange composite membrane in the form of a porous film containing a styrene-vinylbenzyl copolymer prepared by a series of processes of immersing a porous film in the polymerization solution containing a styrene monomer, a vinylbenzyl monomer, a crosslinking agent, and an initiator, and introducing ammonium ions thereto. The anion-exchange membrane prepared by the method above does not include any additive to improve the mechanical strength, so that such properties as strength and impact resistance might be not as high as expected.

Therefore, the present inventors have studied with a focused interest on the preparation method of an anion-exchange composite membrane which is excellent in conductivity, mechanical strength and chemical resistance in addition to the advantage of low production cost and simple process. In the course of the study, the present inventors confirmed that an anion-exchange composite membrane prepared by using an olefin additive, a plasticizer and a polyvinyl halide polymer altogether was excellent in ion exchange capacity and processability, and displayed low electrical resistance, leading to the completion of the present invention.

SUMMARY OF THE INVENTION

It is an object of the present invention to provide a vinylbenzyl-styrene anion-exchange composite membrane containing an olefin additive, a plasticizer and a polyvinyl halide polymer and a preparation method of the same.

To achieve the above object, the present invention provides an anion-exchange composite membrane comprising a copolymer containing a vinylbenzyl trialkylammonium salt repeating unit, a styrene repeating unit, and a divinylbenzene derived repeating unit; an olefin additive; a plasticizer; and a polyvinyl halide polymer.

The present invention also provides a composite membrane module comprising the anion-exchange composite membrane.

The present invention further provides a water treatment method using the composite membrane module above.

The present invention also provides a preparation method of an anion-exchange composite membrane comprising the following steps:

impregnating a support in the form of a fabric in a polymerization solution comprising a vinylbenzyl halogen monomer, a styrene monomer, a divinylbenzene crosslinking agent, an initiator, an olefin additive, a plasticizer and a polyvinyl halide polymer (step 1);

preparing a copolymer composite membrane containing a vinylbenzyl halogen-styrene copolymer produced by polymerizing the vinylbenzyl halogen monomer, the styrene monomer, and the divinylbenzene crosslinking agent included in the support impregnated in step 1; the olefin additive; the plasticizer; and the polyvinyl halide polymer (step 2); and preparing an anion-exchange composite membrane by reacting the copolymer composite membrane of step 2 with a tertiary amine and introducing a quaternary ammonium group as an anion-exchangeable group (step 3).

Advantageous Effect

The anion-exchange composite membrane comprising a copolymer containing a vinylbenzyl trialkylammonium salt repeating unit, a styrene repeating unit, and a divinylbenzene derived repeating unit; an olefin additive; a plasticizer; and a polyvinyl halide polymer of the present invention not only displays low electrical resistance, excellent ion exchange capability, ionic conductivity, mechanical properties, chemical properties, and processability, but also is easy to regulate its ion exchange capability and ionic conductivity. Also, the anion-exchange composite membrane of the invention is easier to produce and cheaper to manufacture than the conventional anion-exchange composite membrane.

BRIEF DESCRIPTION OF THE DRAWINGS

FIG. 1 is a step-wise flow chart illustrating the preparation method of an anion-exchange composite membrane according to the present invention.

DESCRIPTION OF THE PREFERRED EMBODIMENTS

The present invention provides an anion-exchange composite membrane comprising a copolymer containing a vinylbenzyl trialkylammonium salt repeating unit, a styrene repeating unit, and a divinylbenzene derived repeating unit; an olefin additive; a plasticizer; and a polyvinyl halide polymer.

Hereinafter, the anion-exchange composite membrane of the present invention is described in more detail.

The anion-exchange composite membrane of the present invention is characteristically composed of a copolymer containing a vinylbenzyl trialkylammonium salt repeating unit, a styrene repeating unit, and a divinylbenzene derived repeating unit; an olefin additive; a plasticizer; and a polyvinyl halide polymer. The anion-exchange composite membrane of the present invention not only displays low electrical resistance, excellent ion exchange capability, ionic conductivity, mechanical properties, chemical properties, and processability, but also is easy to regulate its ion exchange capability and ionic conductivity.

When the polyvinyl halide polymer is added to the polymerization solution containing the repeating units above in order to produce a composite membrane, the polyvinyl halide polymer is evenly distributed in the solution so that when the solution turns into a solid composite membrane as the polymerization progresses, there is no phase separation and the polymer can be distributed in the inside of the produced anion-exchange composite membrane.

The vinylbenzyl trialkylammonium salt repeating unit introduced with a quaternary ammonium group according to the present invention is represented by formula 1 below.

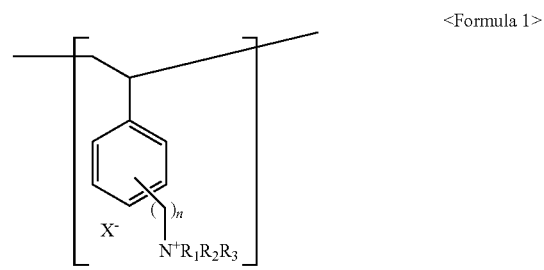

<Formula 1>

In formula 1 above, $R_1$~$R_3$ are independently $C_1$~$C_3$ straight or branched alkyl, X is a halogen element, and n is an integer of 1~3.

In the meantime, the vinylbenzyl repeating unit which has not been introduced with the quaternary ammonium group is used as an ammonium salification active material and can be represented by formula 2 below.

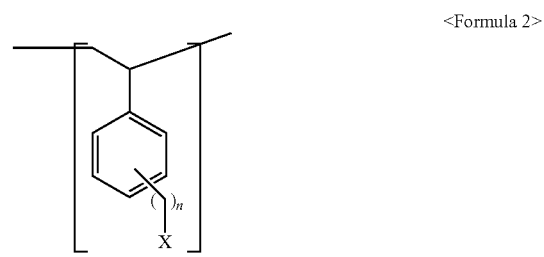

<Formula 2>

In formula 2 above, X is a halogen element, and n is an integer of 1~3.

The monomer of the vinylbenzyl repeating unit can comprise a monomer selected from the group consisting of vinylbenzyl chloride, vinylbenzyl bromide, vinylbenzyl iodide, and the combinations thereof, but not always limited thereto. Preferably, the vinylbenzyl monomer can be vinylbenzyl chloride, which is an ammonium salification active material.

The styrene repeating unit is represented by formula 3 below.

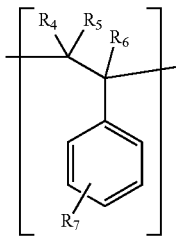

<Formula 3>

As shown in formula 3 above, $R_4$~$R_6$ are hydrogen, halogen elements, or $C_1$~$C_3$ straight or branched alkyl, and $R_7$ can be $C_1$~$C_3$ alkyl in which hydrogen of the alkyl can be substituted with 1 to 3 halogen elements.

The styrene repeating unit is used as an ammonium salification inactive material, and the styrene repeating unit monomer can be selected and used without limitation as long as it is a known compound including styrene.

The ammonium salification active vinylbenzyl monomer gives a functional group capable of introducing an anion-exchangeable group, so that the ion exchange capacity and the water content increase as the composition of the copolymer increases. The ammonium salification inactive styrene monomer inhibits the introduction of the anion-exchangeable group, so that the ion exchange capacity is lowered as the composition of the copolymer increases, but the membrane strength can be maintained by lowering the water content.

Therefore, the ion exchange capacity and the ionic conductivity of the anion-exchange composite membrane can be easily controlled by regulating the composition of the vinylbenzyl repeating unit and the styrene repeating unit.

The polyvinyl halide polymer can be polyvinyl fluoride, polyvinylidene fluoride, polyvinyl chloride, polyvinylidene chloride, and a copolymer thereof. As an example, the polyvinylidene fluoride (PVDF) can be represented by formula 4 below.

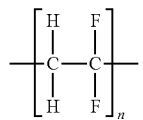

<Formula 4>

In formula 4 above, n is an integer of 500 to 10,000.

When the polyvinyl halide polymer is crosslinked with a copolymer containing the vinylbenzyl trialkylammonium salt repeating unit, the styrene repeating unit and the divinylbenzene derived repeating unit, the strength of the anion-exchange composite membrane can be improved, suggesting that the problem of increasing brittleness in the course of drying process can be solved. Therefore, the anion-exchange composite membrane of the present invention can exhibit excellent mechanical properties by including the polyvinyl halide polymer.

As the polyvinyl halide polymer, the general polymers such as polyvinylidene fluoride (PVDF) and polyvinyl chloride (PVC), which are usually used in molding a polymer product can be used. Preferably, the weight average molecular weight of the polyvinyl halide polymer is approximately 5,000 g/mol~500,000 g/mol, and more preferably about 50,000 g/mol~500,000 g/mol, but not always limited thereto. More specifically, the weight average molecular weight of the polyvinyl halide polymer above can be approximately 50,000 g/mol~500,000 g/mol, 70,000 g/mol~500,000 g/mol, 100,000 g/mol~500,000 g/mol, 150,000 g/mol~500,000 g/mol, 200,000 g/mol~500,000 g/mol, 250,000 g/mol~500,000 g/mol, 300,000 g/mol~500,000 g/mol, 350,000 g/mol~500,000 g/mol, 400,000 g/mol~500,000 g/mol, 450,000 g/mol~500,000 g/mol, 50,000 g/mol~450,000 g/mol, 50,000 g/mol~400,000 g/mol, 50,000 g/mol~350,000 g/mol, 50,000 g/mol~300,000 g/mol, 50,000 g/mol~250,000 g/mol, 50,000 g/mol~200,000 g/mol, 50,000 g/mol~150,000 g/mol, 50,000 g/mol~100,000 g/mol, or 50,000 g/mol~70,000 g/mol, but not always limited thereto. If the molecular weight of the polyvinyl halide polymer is less than 50,000 g/mol, the effect of the polymer is not much so that the brittleness problem of the anion-exchange composite membrane cannot be improved. In the meantime, if the molecular weight of the polyvinyl halide polymer exceeds 500,000 g/mol, the phase separation of the anion-exchange composite membrane occurs and the strength of the membrane is reduced.

The olefin additive above can be butene, pentene, hexene, heptene, octene, nonene, or decene, which can be used independently or as combined together. The olefin additive herein is more preferably hexene, pentene, octane, or nonene. When the olefin additive is added to the copolymer containing the vinylbenzyl trialkylammonium salt repeating unit, the styrene repeating unit and the divinylbenzene derived repeating unit, the flexibility of the membrane can be improved, indicating that the problem of increasing brittleness in the course of drying process can be solved.

Further, the plasticizer above can be any general plasticizer used in molding a polymer product, but is preferably a phthalate-based plasticizer such as dioctyl phthalate, diisononyl phthalate and dibutyl phthalate, or an adipate-based plasticizer such as dioctyl adipate and diisononyl adipate or dioctyl malate, which can be used independently or together as combined. When the plasticizer is added to a copolymer containing the vinylbenzyl trialkylammonium salt repeating unit, the styrene repeating unit and the divinylbenzene derived repeating unit, excellent mechanical properties can be obtained.

The anion-exchange composite membrane of the present invention can include a support additionally, and at this time the copolymer, the olefin additive, the plasticizer and the polyvinyl halide polymer can be supported by the added support. The support herein can be a material having excellent mechanical strength and chemical resistance, which might be in the form of a fabric. By using the support, the mechanical strength and chemical resistance of the anion-exchange composite membrane can be improved. The support is exemplified by polyethylene, polypropylene, polyvinyl chloride, polytetrafluoroethylene, and a combination thereof, but not always limited thereto.

Next, the copolymer can additionally include a divinylbenzene derived repeating unit and an initiator. The divinylbenzene derived repeating unit plays a role in controlling the swelling degree and crosslinking degree of the final composite membrane. Any divinylbenzene derived repeating unit capable of crosslinking the copolymer can be used without limitation.

At this time, the copolymer can include 25 to 85 weight parts of the styrene repeating unit and 5 to 45 weight parts of the divinylbenzene derived repeating unit by 100 weight parts of the vinylbenzyl trialkylammonium salt repeating unit, but the composition is not always limited thereto.

The polyvinyl halide polymer content is 5 to 45 weight parts by 100 weight parts of the repeating unit mixture containing the vinylbenzyl trialkylammonium salt repeating unit, the styrene repeating unit, and the divinylbenzene derived repeating unit. The olefin additive content is 3 to 10 weight parts by 100 weight parts of the repeating unit mixture containing the vinylbenzyl trialkylammonium salt repeating unit, the styrene repeating unit, and the divinylbenzene derived repeating unit. The plasticizer content is 3 to 12 weight parts by 100 weight parts of the repeating unit mixture containing the vinylbenzyl trialkylammonium salt repeating unit, the styrene repeating unit, and the divinylbenzene derived repeating unit. The initiator content is 0.5 to 5 weight parts by 100 weight parts of the repeating unit mixture containing the vinylbenzyl trialkylammonium salt repeating unit, the styrene repeating unit, and the divinylbenzene derived repeating unit, but not always limited thereto.

If the polyvinyl halide polymer content is less than 5 weight parts, the effect could not be good enough to improve the brittleness of the anion-exchange composite membrane. On the contrary, if the content exceeds 45 weight parts, the phase separation of the anion-exchange composite membrane occurs and the strength of the membrane is reduced.

If the olefin additive content is less than 3 weight parts, the effect could not be good enough to improve the brittleness of the anion-exchange composite membrane. On the contrary, if the content exceeds 10 weight parts, the phase separation of the anion-exchange composite membrane occurs and the strength of the membrane is reduced.

If the plasticizer content is less than 3 weight parts, the effect could not be good enough to improve the brittleness of the anion-exchange composite membrane. On the contrary, if the content exceeds 12 weight parts, the phase separation of the anion-exchange composite membrane occurs and the strength of the membrane is reduced.

Further, the initiator herein is not limited as long as it can initiate thermal crosslinking polymerization. Preferably, the initiator can be selected from the group consisting of N,N'-azobisisobutyronitrile (AIBN), benzoyl peroxide (BPO), cumyl peroxide, lauroyl peroxide, and a combination thereof. And more preferably, N,N'-azobisisobutyronitrile (AIBN) or benzoyl peroxide (BPO) can be used.

The present invention further provides a water treatment method using a composite membrane module containing the anion-exchange composite membrane and the composite membrane module.

The water treatment method using the composite membrane module containing the anion-exchange composite membrane above facilitates high purity separation/purification with less energy consumption and requires low equipment investment cost because the required device is simple, compared with the conventional separation method based on distillation or chemical treatment. It also facilitates a continuous process, suggesting that the processing ability per hour is excellent, so that the method can be used in various industrial fields.

In particular, when the anion-exchange composite membrane comprising a copolymer containing a vinylbenzyl repeating unit, a styrene repeating unit and a divinylbenzene derived repeating unit; an olefin additive; a plasticizer; and a polyvinyl halide polymer is used, the final membrane demonstrates excellent ion exchange capacity and excellent mechanical and chemical properties, in addition to the economical merit resulted from the low production costs.

The present invention further provides a method of water purification and wastewater treatment by removing ionic contaminants by electrodialysis using a composite membrane module containing the anion-exchange composite membrane, and a method for concentrating and recovering high value-added anions.

The present invention also provides a reverse electrodialysis method using a composite membrane module containing the anion-exchange composite membrane for water purification, wastewater treatment, sea water desalination, brackish water desalination, deep sea water production, amino acid recovery, organic acid recovery, organic metal recovery, rare metal recovery, ultrapure water production, salt production and electricity production.

However, the application range of the composite membrane module containing the anion-exchange composite membrane is not limited to the application fields mentioned above.

In addition, the present invention provides a preparation method of an anion-exchange composite membrane comprising the following steps:

impregnating a support in the form of a fabric in a polymerization solution comprising a vinylbenzyl halogen monomer, a styrene monomer, a divinylbenzene crosslinking agent, an initiator, an olefin additive, a plasticizer and a polyvinyl halide polymer (step 1);

preparing a copolymer composite membrane containing a vinylbenzyl halogen-styrene copolymer produced by polymerizing the vinylbenzyl halogen monomer, the styrene monomer, and the divinylbenzene crosslinking agent included in the support impregnated in step 1; the olefin additive; the plasticizer; and the polyvinyl halide polymer (step 2); and preparing an anion-exchange composite membrane by reacting the copolymer composite membrane of step 2 with a tertiary amine and introducing a quaternary ammonium group as an anion-exchangeable group (step 3).

Hereinafter, the preparation method of an anion-exchange composite membrane according to the present invention is described step by step in more detail with referring FIG. 1.

First, in the preparation method of an anion-exchange composite membrane of the present invention, step 1 is to impregnate a support in the form of a fabric in a polymerization solution comprising a vinylbenzyl halogen monomer, a styrene monomer, a divinylbenzene crosslinking agent, an initiator, an olefin additive, a plasticizer and a polyvinyl halide polymer (S100).

Particularly, the polymerization solution of step 1 is prepared by mixing a vinylbenzyl halogen monomer, a styrene monomer, a divinylbenzene crosslinking agent, an olefin additive, a plasticizer and a polyvinyl halide polymer.

At this time, the vinylbenzyl halogen monomer is represented by formula 5 below.

<Formula 5>

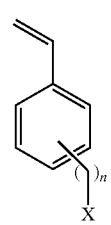

In formula 6 above, X is a halogen element, and n is an integer of 1~3.

The vinylbenzyl halogen monomer can comprise a monomer selected from the group consisting of vinylbenzyl chloride, vinylbenzyl bromide, vinylbenzyl iodide, and the combinations thereof, but not always limited thereto. Preferably, the vinylbenzyl monomer can be vinylbenzyl chloride, which is an ammonium salification active material.

The styrene monomer is represented by formula 6 below.

<Formula 6>

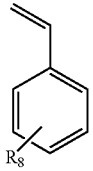

In formula 6 above, $R_8$ can be $C_0$~$C_3$ alkyl or the alkyl with the substitution of 1~3 halogen elements on hydrogen.

The styrene monomer is used as an ammonium salification inactive material, and the styrene monomer can be selected and used without limitation as long as it is a known compound including styrene.

The ammonium salification active vinylbenzyl halogen monomer gives a functional group capable of introducing an anion-exchangeable group, so that the ion exchange capacity and the water content increase as the composition of the copolymer increases. The ammonium salification inactive styrene monomer inhibits the introduction of the anion-exchangeable group, so that the ion exchange capacity is lowered as the composition of the copolymer increases, but the membrane strength can be maintained by lowering the water content.

Therefore, the ion exchange capacity and the ionic conductivity of the anion-exchange composite membrane can be easily controlled by regulating the composition of the vinylbenzyl halogen monomer and the styrene monomer.

In the preparation of a composite membrane via polymerization using a polymerization solution containing the polyvinyl halide polymer above, the polyvinyl halide polymer should be distributed evenly in the polymerization solution and the even distribution has to be maintained in the composite membrane without phase separation of the polyvinyl halide polymer even after the solution turns into a solid membrane as the reaction progresses. The polyvinyl halide polymer used in this invention can be easily dissolved in the monomer mixture comprising the vinylbenzyl halogen monomer and the styrene monomer, so that the phase can be maintained evenly. Even after the polymerization and crosslinking, the polyvinyl halide polymer can be distributed evenly in the composite membrane without phase separation, suggesting that it is a highly copolymer-friendly additive for the vinylbenzyl halogen monomer and the styrene monomer.

Compared with the conventional anion-exchange composite membrane, the anion-exchange composite membrane of the invention is economical because it is easy to manufacture and uses an inexpensive polyvinyl halide polymer.

When the polyvinyl halide polymer is mixed with the vinylbenzyl trialkylammonium salt-styrene copolymer, the strength of the anion-exchange composite membrane can be improved, suggesting that the problem of increasing brittleness in the course of drying process can be solved. Therefore, the anion-exchange composite membrane of the present invention can exhibit excellent mechanical properties by including the polyvinyl halide polymer.

Herein, the polyvinyl halide polymer can be polyvinyl fluoride, polyvinylidene fluoride, polyvinyl chloride, polyvinylidene chloride, and a copolymer thereof. The polyvinyl halide polymer can be polyvinylidene fluoride (PVDF) or polyvinyl chloride (PVC) generally used for molding a polymer product. Preferably, the weight average molecular weight of the polyvinyl halide polymer is approximately 5,000 g/mol~500,000 g/mol, and more preferably about 50,000 g/mol~500,000 g/mol, but not always limited thereto. More specifically, the weight average molecular weight of the polyvinyl halide polymer above can be approximately 50,000 g/mol~500,000 g/mol, 70,000 g/mol~500,000 g/mol, 100,000 g/mol~500,000 g/mol, 150,000 g/mol~500,000 g/mol, 200,000 g/mol~500,000 g/mol, 250,000 g/mol~500,000 g/mol, 300,000 g/mol~500,000 g/mol, 350,000 g/mol~500,000 g/mol, 400,000 g/mol~500,000 g/mol, 450,000 g/mol~500,000 g/mol, 50,000 g/mol~450,000 g/mol, 50,000 g/mol~400,000 g/mol, 50,000 g/mol~350,000 g/mol, 50,000 g/mol~300,000 g/mol, 50,000 g/mol~250,000 g/mol, 50,000 g/mol~200,000 g/mol, 50,000 g/mol~150,000 g/mol, 50,000 g/mol~100,000 g/mol, or 50,000 g/mol~70,000 g/mol, but not always limited thereto. If the molecular weight of the polyvinyl halide polymer is less than 5,000 g/mol, the effect of the polymer is not much so that the brittleness problem of the anion-exchange composite membrane cannot be improved. In the meantime, if the molecular weight of the polyvinyl halide polymer exceeds 500,000 g/mol, the phase separation of the anion-exchange composite membrane occurs and the strength of the membrane is reduced.

The olefin additive above can be butene, pentene, hexene, heptene, octene, nonene, or decene, which can be used independently or as combined together. The olefin additive herein is more preferably hexene, pentene, octene, or nonene. When the olefin additive is added to the copolymer containing the vinylbenzyl trialkylammonium salt repeating unit, the styrene repeating unit, and the divinylbenzene derived repeating unit, the flexibility of the membrane can be improved, indicating that the problem of increasing brittleness in the course of drying process can be solved.

Further, the plasticizer above can be any general plasticizer used in molding a polymer product, but is preferably a phthalate-based plasticizer such as dioctyl phthalate, diisononyl phthalate and dibutyl phthalate, or an adipate-based plasticizer such as dioctyl adipate and diisononyl adipate or dioctyl malate, which can be used independently or together as combined. When the plasticizer is added to a copolymer containing the vinylbenzyl trialkylammonium salt repeating unit, the styrene repeating unit, and the divinylbenzene derived repeating unit, excellent mechanical properties can be obtained.

The support herein can be a material having excellent mechanical strength and chemical resistance, which might be in the form of a fabric. By using the support, the mechanical strength and chemical resistance of the anion-exchange composite membrane can be improved. The support is exemplified by polyethylene, polypropylene, polyvinyl chloride, polytetrafluoroethylene, and a combination thereof, but not always limited thereto.

By impregnating the support in the form of a fabric in the polymerization solution, the pores of the support can be filled with the polymerization solution, and in the process of the network structure in the space between the fibers, the polyvinyl halide polymer is distributed evenly therein with displaying excellent mechanical strength and chemical resistance. Therefore, the preparation method of the invention is advantageous in the preparation of an anion-exchange composite membrane with excellent mechanical strength and chemical resistance, compared with the conventional membrane.

The polymerization solution can additionally contain a divinylbenzene crosslinking agent and an initiator. The solution may include 25 to 85 weight parts of the styrene monomer and 5 to 45 weight parts of the divinylbenzene crosslinking agent by 100 weight parts of the vinylbenzyl monomer, but not always limited thereto.

The polyvinyl halide polymer content is 5 to 45 weight parts by 100 weight parts of the monomer mixture containing the vinylbenzyl monomer, the styrene monomer, and the divinylbenzene crosslinking agent. The olefin additive content is 3 to 10 weight parts by 100 weight parts of the monomer mixture containing the vinylbenzyl monomer, the styrene monomer, and the divinylbenzene crosslinking agent. The plasticizer content is 3 to 12 weight parts by 100 weight parts of the monomer mixture containing the vinylbenzyl monomer, the styrene monomer, and the divinylbenzene crosslinking agent. The initiator content is 0.5 to 5 weight parts by 100 weight parts of the monomer mixture containing the vinylbenzyl monomer, the styrene monomer, and the divinylbenzene crosslinking agent, but not always limited thereto.

If the polyvinyl halide polymer content is less than 5 weight parts, the effect could not be good enough to improve the brittleness of the anion-exchange composite membrane. On the contrary, if the content exceeds 45 weight parts, the phase separation of the anion-exchange composite membrane occurs and the strength of the membrane is reduced.

If the olefin additive content is less than 3 weight parts, the effect could not be good enough to improve the brittleness of the anion-exchange composite membrane. On the contrary, if the content exceeds 10 weight parts, the phase separation of the anion-exchange composite membrane occurs and the strength of the membrane is reduced.

If the plasticizer content is less than 3 weight parts, the effect could not be good enough to improve the brittleness of the anion-exchange composite membrane. On the contrary, if the content exceeds 12 weight parts, the phase separation of the anion-exchange composite membrane occurs and the strength of the membrane is reduced.

The divinylbenzene crosslinking agent plays a role in controlling the swelling degree and crosslinking degree of the final composite membrane. Any crosslinking agent capable of crosslinking the monomer mixture can be used without limitation.

Further, the initiator herein is not limited as long as it can initiate thermal crosslinking polymerization. Preferably, the initiator can be selected from the group consisting of N,N'-azobisisobutyronitrile (AIBN), benzoyl peroxide (BPO), cumyl peroxide, lauroyl peroxide, and a combination thereof. And more preferably, N,N'-azobisisobutyronitrile (AIBN) or benzoyl peroxide (BPO) can be used.

Next, step 2 is to prepare a copolymer composite membrane containing the vinylbenzyl halogen-styrene copolymer produced by polymerizing the vinylbenzyl halogen monomer, the styrene monomer, and the divinylbenzene crosslinking agent included in the support impregnated in step 1; the olefin additive; the plasticizer; and the polyvinyl halide polymer (S200).

At this time, the impregnation of the support in the form of a fabric can be maintained at room temperature for about 30 minutes~24 hours in the polymerization solution in step 1 prior to step 2, but not always limited thereto. For example, the impregnation of the support in the form of a fabric can be maintained at room temperature for about 30 minutes~24 hours, about 1 hour~24 hours, about 2 hours~24 hours, about 3 hours~24 hours, about 4 hours~24 hours, about 5 hours~24 hours, about 6 hours~24 hours, about 7 hours~24 hours, about 8 hours~24 hours, about 9 hours~24 hours, about 10 hours~24 hours, about 11 hours~24 hours, about 12 hours~24 hours, about 14 hours~24 hours, about 16 hours~24 hours, about 18 hours~24 hours, about 20 hours~24 hours, about 22 hours~24 hours, about 30 minutes~22 hours, about 30 minutes~20 hours, about 30 minutes~18 hours, about 30 minutes~16 hours, about 30 minutes~14 hours, about 30 minutes~12 hours, about 30 minutes~11 hours, about 30 minutes~10 hours, about 30 minutes~9 hours, about 30 minutes~8 hours, about 30 minutes~7 hours, about 30 minutes~6 hours, about 30 minutes~5 hours, about minutes~4 hours, about 30 minutes~3 hours, about 30 minutes~2 hours, or about 30 minutes~1 hour, and more preferably about 1~12 hours, but not always limited thereto. By maintaining the impregnation sufficiently during this time, the vinylbenzyl halogen monomer, the styrene monomer, the olefin additive, the plasticizer, the polyvinyl halide polymer, the crosslinking agent, and the initiator can be sufficiently adsorbed to the support in the form of a fabric, leading to the equilibrium state.

Thereafter, a copolymer composite membrane comprising the vinylbenzyl halogen-styrene copolymer, the olefin additive crosslinked to the copolymer, the plasticizer and the polyvinyl halide polymer crosslinked to the copolymer can be prepared via the polymerization reaction in step 2. At this time, the polymerization reaction can be performed at 50° C.~100° C., but not always limited thereto. For example, the polymerization reaction above can be performed at 50° C.~100° C., 60° C.~100° C., 70° C.~100° C., 80° C.~100° C., 90° C.~100° C., 50° C.~90° C., 50° C.~80° C., 50° C.~70° C., or 50° C.~60° C., but not always limited thereto. If the polymerization temperature is lower than 50° C., the polymerization cannot be performed smoothly. If the polymerization temperature is higher than 100° C., the physical properties of the produced copolymer composite membrane can be deteriorated.

The polymerization reaction can be performed for about 6~24 hours, but not always limited thereto. For example, the polymerization can be performed for about 6~24 hours, for about 8~24 hours, for about 10~24 hours, for about 12~24 hours, for about 14~24 hours, for about 16~24 hours, for about 18~24 hours, for about 20~24 hours, for about 22~24 hours, for about 6~22 hours, for about 6~20 hours, for about 6~18 hours, for about 6~16 hours, for about 6~14 hours, for about 6~12 hours, for about 6~10 hours, or for about 6~8 hours, but not always limited thereto. If the polymerization time is less than 6 hours, the polymerization cannot be performed smoothly. If the polymerization time is longer than 24 hours, the polymerization reaction could have been already finished and the extra hours are meaningless and the physical properties of the prepared copolymer composite membrane might be reduced.

Upon completion of the polymerization reaction, the unreacted monomers remaining on the copolymer composite membrane can be washed off using an organic solvent. The organic solvent herein can be one of those organic solvents selected from the group consisting of tetrahydrofuran, dichloroethane, acetone, toluene, and combinations thereof, but not always limited thereto.

Next, step 3 is to prepare an anion-exchange composite membrane by reacting the copolymer composite membrane of step 2 with a tertiary amine and introducing a quaternary ammonium group as an anion-exchangeable group (S300).

At this time, the tertiary amine of step 3 can react with the vinylbenzyl halogen, and specifically, the quaternary ammonium group can be introduced by replacing the halogen element with the tertiary amine. The tertiary amine can be represented by $NR_1R_2R_3$, wherein $R_1 \sim R_3$ are independently $C_1 \sim C_{10}$ linear, branched or cyclic alkyl or $C_6 \sim C_{12}$ aryl. For example, the tertiary amine can include an amine selected from the group consisting of trimethylamine, triethylamine, diphenylethylamine, diethylphenylamine, and a combination thereof, but not always limited thereto.

The copolymer composite membrane can be reacted with only the tertiary amine, or can be reacted with the tertiary amine diluted in an organic solvent such as acetone or tetrahydrofuran, but not always limited thereto.

The concentration of the tertiary amine is not particularly limited, but the preferable concentration is 1 weight %~50 weight %.

The reaction between the copolymer composite membrane and the tertiary amine can be performed by immersing the composite membrane in amine or an amine solution for about 1 hour to about 36 hours, but not always limited thereto. For example, the reaction can be performed for about 1~36 hours, for about 2~36 hours, for about 4~36 hours, for about 6~36 hours, for about 8~36 hours, for about 10~36 hours, for about 12~36 hours, for about 14~36 hours, for about 16~36 hours, for about 18~36 hours, for about 20~36 hours, for about 22~36 hours, for about 24~36 hours, for about 26~36 hours, for about 28~36 hours, for about 30~36 hours, for about 32~36 hours, for about 34~36 hours, for about 1~34 hours, for about 1~32 hours, for about 1~30 hours, for about 1~28 hours, for about 1~26 hours, for about 1~24 hours, for about 1~22 hours, for about 1~20 hours, for about 1~18 hours, for about 1~16 hours, for about 1~14 hours, for about 1~12 hours, for about 1~10 hours, for about 1~8 hours, for about 1~6 hours, for about 1~4 hours, or for about 1~2 hours, but not always limited thereto. Preferably, the reaction can be performed for about 12~24 hours.

Upon completion of the reaction, the copolymer composite membrane is washed with ultrapure water or an organic solvent several times at room temperature in order to remove the unreacted amine remaining on the copolymer composite membrane. The copolymer composite membrane is immersed again in ultrapure water or an organic solvent for one day and then washed several times, leading to the preparation of an anion-exchange composite membrane introduced with the quaternary ammonium group.

The anion-exchange composite membrane prepared according to the preparation method above has excellent ion exchange capacity and improved mechanical properties by using a high-strength support in the form of a fabric. In addition, the anion-exchange composite membrane has lower water content than the anion-exchange composite membrane without the addition of a polyvinyl halide polymer, an olefin additive and a plasticizer, resulting in significantly lower brittleness and improved strength. In addition, the anion-exchange composite membrane of the invention has an excellent ionic conductivity by having a low membrane area resistance and the flexibility of the membrane is increased and accordingly, the ion distribution of the whole membrane is improved.

Practical and presently preferred embodiments of the present invention are illustrative as shown in the following Examples.

However, it will be appreciated by those skilled in the art, on consideration of this disclosure, may make modifications and improvements within the spirit and scope of the present invention.

Example 1: Preparation of an Anion-Exchange Composite Membrane Containing PVDF-1

Step 1: Vinylbenzyl chloride, styrene and divinylbenzene monomers were mixed in the weight ratio of 60:30:10, to which 1 weight % of benzoyl peroxide (BPO) was added by 100 weight % of the monomer mixture as an initiator. A polymerization solution was prepared by adding PVDF at the concentration of 5 weight parts by 100 weight parts of the mixture. Then, a polyethylene support in the form of a fabric having the thickness of about 180 μm was impregnated in the polymerization solution for 4 hours.

Step 2: The polyethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65° C. for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer and PVDF was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group ($-N^+(CH_3)_3$) into the chloride site of vinylbenzyl chloride was prepared. By the steps above, a PVDF-added vinylbenzyl-styrene-based anion-exchange composite membrane which is approximately 220 μm in the total membrane thickness and includes polyethylene as a support was prepared.

Example 2: Preparation of an Anion-Exchange Composite Membrane Containing PVDF-2

Step 1: Vinylbenzyl chloride, styrene and divinylbenzene monomers were mixed in the weight ratio of 60:25:15, to which 1 weight % of benzoyl peroxide (BPO) was added by 100 weight % of the monomer mixture as an initiator. A polymerization solution was prepared by adding PVDF at the concentration of 10 weight parts by 100 weight parts of the mixture. Then, a polypropylene support in the form of a fabric having the thickness of about 180 μm was impregnated in the polymerization solution for 3 hours.

Step 2: The polypropylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65° C. for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer and PVDF was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group ($-N^+(CH_3)_3$) into the chloride site of vinylbenzyl chloride was prepared. By the steps above, a PVDF-added vinylbenzyl-styrene-based anion-exchange composite membrane which is approximately 220 μm in the total membrane thickness and includes polypropylene as a support was prepared.

Example 3: Preparation of an Anion-Exchange Composite Membrane Containing PVDF-3

Step 1: Vinylbenzyl chloride, styrene and divinylbenzene monomers were mixed in the weight ratio of 60:25:15, to which 1 weight % of benzoyl peroxide (BPO) was added by 100 weight % of the monomer mixture as an initiator. A polymerization solution was prepared by adding PVDF at the concentration of 20 weight parts by 100 weight parts of the mixture. Then, a polyvinyl chloride support in the form of a fabric having the thickness of about 180 μm was impregnated in the polymerization solution for 4 hours.

Step 2: The polyvinyl chloride support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 80° C. for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer and PVDF was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group ($-N^+(CH_3)_3$) into the chloride site of vinylbenzyl chloride was prepared. By the steps above, a PVDF-added vinylbenzyl-styrene-based anion-exchange composite membrane which is approximately 220 μm in the total membrane thickness and includes polyvinyl chloride as a support was prepared.

Example 4: Preparation of an Anion-Exchange Composite Membrane Containing PVDF-4

Step 1: Vinylbenzyl chloride, styrene and divinylbenzene monomers were mixed in the weight ratio of 60:25:15, to which 1 weight % of benzoyl peroxide (BPO) was added by 100 weight % of the monomer mixture as an initiator. A polymerization solution was prepared by adding PVDF at the concentration of 30 weight parts by 100 weight parts of the mixture. Then, a polytetrafluoroethylene support in the form of a fabric having the thickness of about 180 μm was impregnated in the polymerization solution for 4 hours.

Step 2: The polytetrafluoroethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 80° C. for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer and PVDF was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group ($-N^+(CH_3)_3$) into the chloride site of vinylbenzyl chloride was prepared. By the steps above, a PVDF-added vinylbenzyl-styrene-based anion-exchange composite membrane which is approximately 220 μm in the total membrane thickness and includes polytetrafluoroethylene as a support was prepared.

Example 5: Preparation of an Anion-Exchange Composite Membrane Containing an Olefin Additive, a Plasticizer and PVDF-1

Step 1: Vinylbenzyl chloride, styrene and divinylbenzene monomers were mixed in the weight ratio of 30:60:10, to which 1 weight % of benzoyl peroxide (BPO) was added by 100 weight % of the monomer mixture as an initiator. A polymerization solution was prepared by adding PVDF at the concentration of 5 weight parts, 1-hexene, the olefin additive, at the concentration of 3 weight parts, and dioctyl phthalate, the plasticizer, at the concentration of 3 weight parts by 100 weight parts of the mixture. Then, a polyethylene support in the form of a fabric having the thickness of about 180 μm was impregnated in the polymerization solution for 4 hours.

Step 2: The polyethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65☐ for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer, an olefin additive, a plasticizer and PVDF was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group ($-N^+(CH_3)_3$) into the chloride site of vinylbenzyl chloride was prepared. By the steps above, a vinylbenzyl-styrene-based anion-exchange composite membrane added with an olefin additive, a plasticizer and PVDF which is approximately 220 μm in the total membrane thickness and includes polyethylene as a support was prepared.

Example 6: Preparation of an Anion-Exchange Composite Membrane Containing an Olefin Additive, a Plasticizer and PVDF-2

Step 1: Vinylbenzyl chloride, styrene and divinylbenzene monomers were mixed in the weight ratio of 30:60:10, to which 1 weight % of benzoyl peroxide (BPO) was added by 100 weight % of the monomer mixture as an initiator. A polymerization solution was prepared by adding PVDF at the concentration of 5 weight parts, 1-hexene, the olefin additive, at the concentration of 5 weight parts, and dioctyl phthalate, the plasticizer, at the concentration of 5 weight parts by 100 weight parts of the mixture. Then, a polyethylene support in the form of a fabric having the thickness of about 180 μm was impregnated in the polymerization solution for 4 hours.

Step 2: The polyethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65☐ for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer, an olefin additive, a plasticizer and PVDF was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group ($-N^+(CH_3)_3$) into the chloride site of vinylbenzyl chloride was prepared. By the steps above, a vinylbenzyl-styrene-based anion-exchange composite membrane added with an olefin additive, a plasticizer and PVDF which is approximately 220 μm in the total membrane thickness and includes polyethylene as a support was prepared.

Example 7: Preparation of an Anion-Exchange Composite Membrane Containing an Olefin Additive, a Plasticizer and PVDF-3

Step 1: Vinylbenzyl chloride, styrene and divinylbenzene monomers were mixed in the weight ratio of 30:60:10, to which 1 weight % of benzoyl peroxide (BPO) was added by 100 weight % of the monomer mixture as an initiator. A polymerization solution was prepared by adding PVDF at the concentration of 5 weight parts, 1-hexene, the olefin additive, at the concentration of 7 weight parts, and dioctyl phthalate, the plasticizer, at the concentration of 3 weight parts by 100 weight parts of the mixture. Then, a polyethylene support in the form of a fabric having the thickness of about 180 μm was impregnated in the polymerization solution for 4 hours.

Step 2: The polyethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65☐ for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer, an olefin additive, a plasticizer and PVDF was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group (—N$^+$(CH$_3$)$_3$) into the chloride site of vinylbenzyl chloride was prepared. By the steps above, a vinylbenzyl-styrene-based anion-exchange composite membrane added with an olefin additive, a plasticizer and PVDF which is approximately 220 μm in the total membrane thickness and includes polyethylene as a support was prepared.

Example 8: Preparation of an Anion-Exchange Composite Membrane Containing an Olefin Additive, a Plasticizer and PVDF-4

Step 1: Vinylbenzyl chloride, styrene and divinylbenzene monomers were mixed in the weight ratio of 30:60:10, to which 1 weight % of benzoyl peroxide (BPO) was added by 100 weight % of the monomer mixture as an initiator. A polymerization solution was prepared by adding PVDF at the concentration of 5 weight parts, 1-hexene, the olefin additive, at the concentration of 10 weight parts, and dioctyl phthalate, the plasticizer, at the concentration of 5 weight parts by 100 weight parts of the mixture. Then, a polyethylene support in the form of a fabric having the thickness of about 180 μm was impregnated in the polymerization solution for 4 hours.

Step 2: The polyethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65☐ for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer, an olefin additive, a plasticizer and PVDF was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group (—N$^+$(CH$_3$)$_3$) into the chloride site of vinylbenzyl chloride was prepared. By the steps above, a vinylbenzyl-styrene-based anion-exchange composite membrane added with an olefin additive, a plasticizer and PVDF which is approximately 220 μm in the total membrane thickness and includes polyethylene as a support was prepared.

Example 9: Preparation of an Anion-Exchange Composite Membrane Containing an Olefin Additive, a Plasticizer and PVDF-5

Step 1: Vinylbenzyl chloride, styrene and divinylbenzene monomers were mixed in the weight ratio of 30:60:10, to which 1 weight % of benzoyl peroxide (BPO) was added by 100 weight % of the monomer mixture as an initiator. A polymerization solution was prepared by adding PVDF at the concentration of 5 weight parts, 1-pentene, the olefin additive, at the concentration of 7 weight parts, and dibutyl phthalate, the plasticizer, at the concentration of 3 weight parts by 100 weight parts of the mixture. Then, a polyethylene support in the form of a fabric having the thickness of about 180 μm was impregnated in the polymerization solution for 4 hours.

Step 2: The polyethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65☐ for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer, an olefin additive, a plasticizer and PVDF was prepared.

Step 3: The copolymer composite membrane prepared in the step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group (—N$^+$(CH$_3$)$_3$) into the chloride site of vinylbenzyl chloride was prepared. By the steps above, a vinylbenzyl-styrene-based anion-exchange composite membrane added with an olefin additive, a plasticizer and PVDF which is approximately 220 μm in the total membrane thickness and includes polyethylene as a support was prepared.

Example 10: Preparation of an Anion-Exchange Composite Membrane Containing an Olefin Additive, a Plasticizer and PVDF-6

Step 1: Vinylbenzyl chloride, styrene and divinylbenzene monomers were mixed in the weight ratio of 30:60:10, to which 1 weight % of benzoyl peroxide (BPO) was added by 100 weight % of the monomer mixture as an initiator. A polymerization solution was prepared by adding PVDF at the concentration of 5 weight parts, 1-octene, the olefin additive, at the concentration of 7 weight parts, and dioctyl malate, the plasticizer, at the concentration of 3 weight parts by 100 weight parts of the mixture. Then, a polyethylene support in the form of a fabric having the thickness of about 180 µm was impregnated in the polymerization solution for 4 hours.

Step 2: The polyethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65☐ for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer, an olefin additive, a plasticizer and PVDF was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group ($-N^+(CH_3)_3$) into the chloride site of vinylbenzyl chloride was prepared. By the steps above, a vinylbenzyl-styrene-based anion-exchange composite membrane added with an olefin additive, a plasticizer and PVDF which is approximately 220 µm in the total membrane thickness and includes polyethylene as a support was prepared.

Example 11: Preparation of an Anion-Exchange Composite Membrane Containing an Olefin Additive, a Plasticizer and PVDF-7

Step 1: Vinylbenzyl chloride, styrene and divinylbenzene monomers were mixed in the weight ratio of 30:60:10, to which 1 weight % of benzoyl peroxide (BPO) was added by 100 weight % of the monomer mixture as an initiator. A polymerization solution was prepared by adding PVDF at the concentration of 5 weight parts, 1-nonene, the olefin additive, at the concentration of 7 weight parts, and dioctyl malate, the plasticizer, at the concentration of 3 weight parts by 100 weight parts of the mixture. Then, a polyethylene support in the form of a fabric having the thickness of about 180 µm was impregnated in the polymerization solution for 4 hours.

Step 2: The polyethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65☐ for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer, an olefin additive, a plasticizer and PVDF was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group ($-N^+(CH_3)_3$) into the chloride site of vinylbenzyl chloride was prepared. By the steps above, a vinylbenzyl-styrene-based anion-exchange composite membrane added with an olefin additive, a plasticizer and PVDF which is approximately 220 µm in the total membrane thickness and includes polyethylene as a support was prepared.

Example 12: Preparation of an Anion-Exchange Composite Membrane Containing an Olefin Additive, a Plasticizer and PVC-1

Step 1: Vinylbenzyl chloride, styrene and divinylbenzene monomers were mixed in the weight ratio of 30:60:10, to which 1 weight % of benzoyl peroxide (BPO) was added by 100 weight % of the monomer mixture as an initiator. A polymerization solution was prepared by adding PVC at the concentration of 5 weight parts, 1-hexene, the olefin additive, at the concentration of 3 weight parts, and dioctyl phthalate, the plasticizer, at the concentration of 3 weight parts by 100 weight parts of the mixture. Then, a polyethylene support in the form of a fabric having the thickness of about 180 µm was impregnated in the polymerization solution for 4 hours.

Step 2: The polyethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65☐ for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer, an olefin additive, a plasticizer and PVC was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group (—N⁺(CH₃)₃) into the chloride site of vinylbenzyl chloride was prepared. By the steps above, a vinylbenzyl-styrene-based anion-exchange composite membrane added with an olefin additive, a plasticizer and PVC which is approximately 220 μm in the total membrane thickness and includes polyethylene as a support was prepared.

Example 13: Preparation of an Anion-Exchange Composite Membrane Containing an Olefin Additive, a Plasticizer and PVC-2

Step 1: Vinylbenzyl chloride, styrene and divinylbenzene monomers were mixed in the weight ratio of 30:60:10, to which 1 weight % of benzoyl peroxide (BPO) was added by 100 weight % of the monomer mixture as an initiator. A polymerization solution was prepared by adding PVC at the concentration of 5 weight parts, 1-hexene, the olefin additive, at the concentration of 5 weight parts, and dioctyl phthalate, the plasticizer, at the concentration of 5 weight parts by 100 weight parts of the mixture. Then, a polyethylene support in the form of a fabric having the thickness of about 180 μm was impregnated in the polymerization solution for 4 hours.

Step 2: The polyethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65□ for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer, an olefin additive, a plasticizer and PVC was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group (—N⁺(CH₃)₃) into the chloride site of vinylbenzyl chloride was prepared. By the steps above, a vinylbenzyl-styrene-based anion-exchange composite membrane added with an olefin additive, a plasticizer and PVC which is approximately 220 μm in the total membrane thickness and includes polyethylene as a support was prepared.

Example 14: Preparation of an Anion-Exchange Composite Membrane Containing an Olefin Additive, a Plasticizer and PVC-3

Step 1: Vinylbenzyl chloride, styrene and divinylbenzene monomers were mixed in the weight ratio of 30:60:10, to which 1 weight % of benzoyl peroxide (BPO) was added by 100 weight % of the monomer mixture as an initiator. A polymerization solution was prepared by adding PVC at the concentration of 5 weight parts, 1-hexene, the olefin additive, at the concentration of 7 weight parts, and dioctyl phthalate, the plasticizer, at the concentration of 3 weight parts by 100 weight parts of the mixture. Then, a polyethylene support in the form of a fabric having the thickness of about 180 μm was impregnated in the polymerization solution for 4 hours.

Step 2: The polyethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65□ for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer, an olefin additive, a plasticizer and PVC was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group (—N⁺(CH₃)₃) into the chloride site of vinylbenzyl chloride was prepared. By the steps above, a vinylbenzyl-styrene-based anion-exchange composite membrane added with an olefin additive, a plasticizer and PVC which is approximately 220 μm in the total membrane thickness and includes polyethylene as a support was prepared.

Example 15: Preparation of an Anion-Exchange Composite Membrane Containing an Olefin Additive, a Plasticizer and PVC-4

Step 1: Vinylbenzyl chloride, styrene and divinylbenzene monomers were mixed in the weight ratio of 30:60:10, to which 1 weight % of benzoyl peroxide (BPO) was added by 100 weight % of the monomer mixture as an initiator. A polymerization solution was prepared by adding PVC at the concentration of 5 weight parts, 1-hexene, the olefin additive, at the concentration of 10 weight parts, and dioctyl phthalate, the plasticizer, at the concentration of 5 weight parts by 100 weight parts of the mixture. Then, a polyethylene support in the form of a fabric having the thickness of about 180 μm was impregnated in the polymerization solution for 4 hours.

Step 2: The polyethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65☐ for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer, an olefin additive, a plasticizer and PVC was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group ($-N^+(CH_3)_3$) into the chloride site of vinylbenzyl chloride was prepared. By the steps above, a vinylbenzyl-styrene-based anion-exchange composite membrane added with an olefin additive, a plasticizer and PVC which is approximately 220 μm in the total membrane thickness and includes polyethylene as a support was prepared.

Example 16: Preparation of an Anion-Exchange Composite Membrane Containing an Olefin Additive, a Plasticizer and PVC-5

Step 1: Vinylbenzyl chloride, styrene and divinylbenzene monomers were mixed in the weight ratio of 30:60:10, to which 1 weight % of benzoyl peroxide (BPO) was added by 100 weight % of the monomer mixture as an initiator. A polymerization solution was prepared by adding PVC at the concentration of 5 weight parts, 1-pentene, the olefin additive, at the concentration of 7 weight parts, and dibutyl phthalate, the plasticizer, at the concentration of 3 weight parts by 100 weight parts of the mixture. Then, a polyethylene support in the form of a fabric having the thickness of about 180 μm was impregnated in the polymerization solution for 4 hours.

Step 2: The polyethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65☐ for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer, an olefin additive, a plasticizer and PVC was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group ($-N^+(CH_3)_3$) into the chloride site of vinylbenzyl chloride was prepared. By the steps above, a vinylbenzyl-styrene-based anion-exchange composite membrane added with an olefin additive, a plasticizer and PVC which is approximately 220 μm in the total membrane thickness and includes polyethylene as a support was prepared.

Example 17: Preparation of an Anion-Exchange Composite Membrane Containing an Olefin Additive, a Plasticizer and PVC-6

Step 1: Vinylbenzyl chloride, styrene and divinylbenzene monomers were mixed in the weight ratio of 30:60:10, to which 1 weight % of benzoyl peroxide (BPO) was added by 100 weight % of the monomer mixture as an initiator. A polymerization solution was prepared by adding PVC at the concentration of 5 weight parts, 1-octene, the olefin additive, at the concentration of 7 weight parts, and dioctyl malate, the plasticizer, at the concentration of 3 weight parts by 100 weight parts of the mixture. Then, a polyethylene support in the form of a fabric having the thickness of about 180 μm was impregnated in the polymerization solution for 4 hours.

Step 2: The polyethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65☐ for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer, an olefin additive, a plasticizer and PVC was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group ($-N^+(CH_3)_3$) into the chloride site of vinylbenzyl chloride was prepared. By the steps above, a vinylbenzyl-styrene-based anion-exchange composite membrane added with an olefin additive, a plasticizer and PVC which is approximately 220 μm in the total membrane thickness and includes polyethylene as a support was prepared.

Example 18: Preparation of an Anion-Exchange Composite Membrane Containing an Olefin Additive, a Plasticizer and PVC-7

Step 1: Vinylbenzyl chloride, styrene and divinylbenzene monomers were mixed in the weight ratio of 30:60:10, to which 1 weight % of benzoyl peroxide (BPO) was added by 100 weight % of the monomer mixture as an initiator. A polymerization solution was prepared by adding PVC at the concentration of 5 weight parts, 1-nonene, the olefin additive, at the concentration of 7 weight parts, and dioctyl malate, the plasticizer, at the concentration of 3 weight parts by 100 weight parts of the mixture. Then, a polyethylene support in the form of a fabric having the thickness of about 180 μm was impregnated in the polymerization solution for 4 hours.

Step 2: The polyethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65□ for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a copolymer composite membrane containing a vinylbenzyl chloride-styrene copolymer, an olefin additive, a plasticizer and PVC was prepared.

Step 3: The copolymer composite membrane prepared in step 2 was immersed in a mixed solution comprising trimethylamine solution (25 volume %) and acetone (75 volume %) at the volume ratio of 1:3, followed by quaternary ammonium salification for 24 hours at room temperature. Upon completion of the quaternary ammonium salification, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group (—$N^+(CH_3)_3$) into the chloride site of vinylbenzyl chloride was prepared. By the steps above, a vinylbenzyl-styrene-based anion-exchange composite membrane added with an olefin additive, a plasticizer and PVC which is approximately 220 μm in the total membrane thickness and includes polyethylene as a support was prepared.

Comparative Example 1: Preparation of an Anion-Exchange Composite Membrane without PVDF An anion-exchange composite membrane was prepared by the same manner as described in Example 1 except that PVDF was not used in the course of preparing the polymerization solution in step 1 of Example 1.

Comparative Example 2: a Membrane Prepared by Paste Method

A commercial membrane prepared by the conventional paste method (Astom Japan, AMX, thickness: about 140 μm) was prepared.

Comparative Example 3: Preparation of an Anion-Exchange Composite Membrane Containing an Olefin Additive Step 1: Vinylbenzyl chloride, styrene, and divinylbenzene monomers were mixed in the weight ratio of 60:25:15, to which 1 weight % of N,N'-azobisisobutyronitrile (AIBN) was added by 100 weight % of the monomer mixture as an initiator. A polymerization solution was prepared by adding 1-hexene as an olefin additive at the concentration of weight parts by 50 weight parts of the mixture. Then, a polyethylene support in the form of a fabric having the thickness of about 180 μm was impregnated in the polymerization solution for 4 hours.

Step 2: The polyethylene support impregnated in the polymerization solution in step 1 was placed on a rectangular glass plate, which was covered by another glass plate and then sealed with a tape in order to prevent the loss of the polymerization solution. The glass plate was placed in an oven, followed by polymerization at 65□ for 16 hours to prepare a copolymer composite membrane precursor. Upon completion of the polymerization, the copolymer composite membrane precursor was separated from the glass plate and then immersed in tetrahydrofuran at room temperature, which stood for 12 hours. The precursor was taken out and then washed with tetrahydrofuran several times to eliminate the unreacted monomers. As a result, a composite membrane containing a vinylbenzyl chloride-styrene copolymer and an olefin additive was prepared.

Step 3: The composite membrane prepared in step 2 was immersed in a mixed solution comprising trimethylamine solution (25 volume %) and acetone (75 volume %) at the volume ratio of 1:3, followed by amination for 24 hours at room temperature. Upon completion of the amination, the membrane was washed with ultrapure water several times at room temperature in order to eliminate the unreacted trimethylamine remaining on the composite membrane finished with the reaction. After washing, the membrane was immersed in ultrapure water overnight and then washed several times. As a result, an anion-exchange composite membrane introduced with a quaternary ammonium group (—$N^+(CH_3)_3$) into the chloride site of vinylbenzyl chloride was prepared. By the steps above, a vinylbenzyl-styrene-based anion-exchange composite membrane added with an olefin additive which is approximately 230 μm in the total membrane thickness and includes polyethylene as a support was prepared.

Experimental Example 1: Analysis of the Characteristics of the Anion-Exchange Composite Membrane To confirm the improved characteristics of the anion-exchange composite membrane composed of the vinylbenzyl trialkylammonium salt-styrene copolymer and PVDF, the water content, the ion exchange capacity (IEC) and the membrane area resistance of the anion-exchange composite membranes prepared in Examples 1~18 and Comparative Examples 1~3 were measured by the following experiments. The results are shown in Tables 1~3 below.

First, to measure the water content of the anion-exchange composite membrane, the membrane was immersed in ultra-pure water for 24 hours or more to sufficiently swell the membrane. Then, the membrane was taken out and dried with careful wiping. The increased weight ($W_1(g)$) was measured. The membrane was dried in a vacuum oven set at 120□ for 24 hours. Then, the dry weight ($W_2(g)$) was measured. The water content (%) was calculated by mathematical formula 1 below.

Water Content (%)=[($W_1-W_2$)/$W_2$]×100      <Mathematical Formula 1>

To measure the ion exchange capacity of the anion-exchange composite membrane, the dry weight of the anion-exchange composite membrane was first measured. Then, the membrane was immersed in 1.0 M NaCl solution for 24 hours to induce the substitution of the quaternary ammonium group into the form of —$N^+(R)Cl$—. The membrane was immersed in 0.5 M $Na_2CO_3$ solution for 24 hours to induce the substitution of the ammonium group into $N+(R)_3 CO_3^-$. Potassium bichromate (5%) was added to the solution (1~3 drops) and the chlorine ions ($Cl^-$) distributed in the solution distant from the ionic group were titrated with silver nitrate ($AgNO_3$) until reddish brown precipitation occurred. The ion exchange capacity (IEC, unit meq/g) was calculated by measuring the amount (mL) of consumed silver nitrate via mathematical formula 2 below.

Ion Exchange Capacity (meq/g)= ($V$×$C$)/$Wy$      <Mathematical Formula 2>

(In mathematical formula 2 above, Wy indicates the weight of dried membrane, V indicates the amount of consumed silver nitrate ($AgNO_3$), and C indicates the concentration of silver nitrate ($AgNO_3$) used for titration).

Further, the membrane area resistance of the anion-exchange composite membrane was calculated by mathematical formula 3 below using the impedance values and phase angles measured by an LCZ meter in 0.5 M NaCl aqueous solution.

Membrane Area Resistance (Ω·cm$^2$)=Membrane Area×cos θ×Z      <Mathematical Formula 3>

(In mathematical formula 3 above, θ indicates a phase angle and Z indicates an impedance value).

TABLE 1

| | | Example | | | | Comparative Example | | |
|---|---|---|---|---|---|---|---|---|
| | | Example 1 | Example 2 | Example 3 | Example 4 | Comparative Example 1 | Comparative Example 2 | Comparative Example 3 |
| Polymerization solution composition (weight %) | Fabric support | Polyethylene | Polypropylene | polyvinylchloride | Polytetra-fluoroethylene | Polyethylene | — | Polyethylene |
| | Styrene | 30 | 25 | 25 | 25 | 30 | — | 25 |
| | Vinylbenzyl chloride | 60 | 60 | 60 | 60 | 60 | — | 60 |
| | Divinylbenzene | 10 | 15 | 15 | 15 | 10 | — | 15 |
| | Additive (additive type) * Monomer/ 100 weight part | 5 (PVDF) | 10 (PVDF) | 20 (PVDF) | 30 (PVDF) | — | — | 100 (1-hexene) |
| Physical properties | Ion exchange capacity (meq./g) | 4.2 | 4.0 | 3.7 | 3.5 | 3.7 | 2.4 | 3.8 |
| | Water content (%) | 20 | 18 | 15 | 11 | 46 | 25 | 27 |
| | Membrane area resistance (Ω · cm$^2$) | 1.6 | 1.8 | 2.2 | 2.4 | 3.7 | 3.6 | 2.7 |

TABLE 2

| | | Example 5 | Example 6 | Example 7 | Example 8 | Example 9 | Example 10 | Example 11 |
|---|---|---|---|---|---|---|---|---|
| Polymerization solution composition (weight %) | Fabric support | Polyethylene | Polyethylene | Polyethylene | Polyethylene | Polyethylene | Polyethylene | Polyethylene |
| | Styrene | 30 | 30 | 30 | 30 | 30 | 30 | 30 |
| | Vinylbenzyl chloride | 60 | 60 | 60 | 60 | 60 | 60 | 60 |
| | Divinylbenzene | 10 | 10 | 10 | 10 | 10 | 10 | 10 |
| | Additive (additive type) * Monomer/ 100 weight part | 5 (PVDF) 3 (1-hexene) 3 (dioctyl phthalate) | 5 (PVDF) 5 (1-hexene) 5 (dioctyl phthalate) | 5 (PVDF) 7 (1-hexene) 3 (dioctyl phthalate) | 5 (PVDF) 10 (1-hexene) 5 (dioctyl phthalate) | 5 (PVDF) 7 (1-pentene) 3 (dibutyl phthalate) | 5 (PVDF) 7 (1-octene) 3 (dioctyl malate) | 5 (PVDF) 7 (1-nonene) 3 (dioctyl malate) |
| Physical properties | Ion exchange capacity (meq./g) | 5.1 | 5.3 | 6.0 | 5.5 | 5.6 | 5.5 | 5.4 |

TABLE 2-continued

|  | | Example 5 | Example 6 | Example 7 | Example 8 | Example 9 | Example 10 | Example 11 |
|---|---|---|---|---|---|---|---|---|
|  | Water content (%) | 13 | 12 | 9 | 14 | 10 | 12 | 11 |
|  | Membrane area resistance (Ω · cm²) | 1.0 | 1.1 | 0.9 | 1.5 | 1.4 | 1.4 | 1.5 |

TABLE 3

| | | Example 12 | Example 13 | Example 14 | Example 15 | Example 16 | Example 17 | Example 18 |
|---|---|---|---|---|---|---|---|---|
| Polymerization solution composition (weight %) | Fabric support | Polyethylene | Polyethylene | Polyethylene | Polyethylene | Polyethylene | Polyethylene | Polyethylene |
| | Styrene | 30 | 30 | 30 | 30 | 30 | 30 | 30 |
| | Vinylbenzyl chloride | 60 | 60 | 60 | 60 | 60 | 60 | 60 |
| | Divinylbenzene | 10 | 10 | 10 | 10 | 10 | 10 | 10 |
| | Additive (additive type) * | 5 (PVC) 3 (1-hexene) | 5 (PVC) 5 (1-hexene) | 5 (PVC) 7 (1-hexene) | 5 (PVC) 10 (1-hexene) | 5 (PVC) 7 (1-pentene) | 5 (PVC) 7 (1-octene) | 5 (PVC) 7 (1-nonene) |
| | Monomer/ 100 weight part | 3 (dioctyl phthalate) | 5 (dioctyl phthalate) | 3 (dioctyl phthalate) | 5 (dioctyl phthalate) | 3 (dibutyl phthalate) | 3 (dioctyl malate) | 3 (dioctyl malate) |
| Physical properties | Ion exchange capacity (meq./g) | 5.1 | 5.4 | 6.1 | 5.5 | 5.7 | 5.5 | 5.5 |
| | Water content (%) | 12 | 11 | 9 | 14 | 11 | 11 | 10 |
| | Membrane area resistance (Ω · cm²) | 0.9 | 1.1 | 0.8 | 1.4 | 1.4 | 1.5 | 1.4 |

As shown in Table 1, the anion-exchange composite membranes prepared in Examples 1~4 by using PVDF in the preparation of a polymerization solution were compared with the PVDF-free membrane prepared in Comparative Example 1, the commercial membrane of Comparative Example 2 and the membrane prepared in Comparative Example 3 by using an olefin additive.

The anion-exchange composite membranes of Examples 1~4 of the present invention use a high strength fabric type support and contain PVDF, so that the membranes have a lower water content than that of the membranes of Comparative Examples 1 and 2 and accordingly have a low brittleness and membrane area resistance. Therefore, the permeation of ions is facilitated and the ionic conductivity is significantly improved thereby. Compared with the conventional anion-exchange composite membrane of Comparative Example 3 containing an olefin additive, the membranes of the invention displayed a lower water content and membrane area resistance.

As the concentration of an ion-exchangeable group that endows the ion exchange capacity to an anion-exchange composite membrane goes higher, that is as the ion-exchange capacity goes higher, the possibility of ion-exchange increases and therefore the ion-exchange capacity of the composite membrane increases. However, as the ion-exchange capacity becomes higher, the degree of water swelling of the composite membrane increases, resulting in the decrease of the mechanical properties of the composite membrane. So, it is important to suppress the degree of water swelling while maintaining the ion-exchange capacity. In the present invention, by adding hydrophobic PVDF, the effect of suppressing the degree of water swelling was confirmed while maintaining the ion-exchange capacity.

In addition, the anion-exchange composite membranes of Examples 1~4 of the present invention have a low membrane area resistance so that not only the ionic conductivity is improved but also the flexibility of the membrane increases, by which the ion distribution on the whole membrane is improved evenly. The thickness of the anion-exchange composite membranes of Examples 1~4 is 220 μm, which is thicker than the thickness of the commercial membrane AMX of Comparative Example 2 (140 μm), indicating that the membrane area resistance is way lower. In particular, compared with the composite membrane of Comparative Example 3 containing an olefin additive, the membranes of the invention displayed a lower membrane area resistance and excellent ionic conductivity.

As shown in Table 2 above, the anion-exchange composite membranes of Examples 5~11 using all of PVDF, an olefin additive and a plasticizer for the preparation of the polymerization solution were confirmed to have superior ion exchange capacity along with a lower water content and a lower membrane area resistance.

In particular, the membrane of Example 7 demonstrated as excellent ion exchange capacity as 6.0 meq./g along with as low water content as 9% and as low membrane area resistance as 0.9 Ω·cm².

Further, as shown in Table 3 above, the anion-exchange composite membranes of Examples 12~18 using all of PVC, an olefin additive and a plasticizer for the preparation of the polymerization solution were confirmed to have superior ion exchange capacity along with a lower water content and a lower membrane area resistance.

In particular, the membrane of Example 14 demonstrated as excellent ion exchange capacity as 6.1 meq./g along with as low water content as 9% and as low membrane area resistance as 0.8 $\Omega \cdot cm^2$.

Therefore, the anion-exchange composite membrane comprising the vinylbenzyl trialkylammonium salt-styrene copolymer, the olefin additive, the plasticizer and PVDF of the present invention was confirmed to have a low electrical resistance but the improved ion-exchange capacity, mechanical properties, chemical properties, processability and ionic conductivity, in addition to the advantages of saving costs due to the relatively less expensive PVDF and easy preparation.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended Claims.

What is claimed is:

1. An anion-exchange composite membrane comprising a copolymer containing a vinylbenzyl trialkylammonium salt repeating unit, a styrene repeating unit and a divinylbenzene derived repeating unit; an olefin additive; a plasticizer; and a polyvinyl halide polymer.

2. The anion-exchange composite membrane according to claim 1, wherein the polyvinyl halide polymer is one or more compounds selected from the group consisting of polyvinyl fluoride, polyvinylidene fluoride, polyvinyl chloride, polyvinylidene chloride, and the copolymers thereof, and the weight average molecular weight of the polyvinyl halide polymer is 5,000 g/mol to 500,000 g/mol.

3. The anion-exchange composite membrane according to claim 1, wherein the olefin additive is one or more compounds selected from the group consisting of butene, pentene, hexene, heptene, octene, nonene, and decene.

4. The anion-exchange composite membrane according to claim 1, wherein the plasticizer is one or more compounds selected from the group consisting of dioctyl phthalate, diisononyl phthalate, dibutyl phthalate, dioctyl adipate, diisononyl adipate, and dioctyl malate.

5. The anion-exchange composite membrane according to claim 1, wherein the anion-exchange composite membrane additionally includes a support in the form of a fabric.

6. The anion-exchange composite membrane according to claim 5, wherein the support comprises a material selected from the group consisting of polyethylene, polypropylene, polyvinylchloride, polytetrafluoroethylene, and a combination thereof.

7. The anion-exchange composite membrane according to claim 1, wherein the copolymer includes the styrene repeating unit at the concentration of 25~85 weight parts and the divinylbenzene derived repeating unit at the concentration of 5~45 weight parts by 100 weight parts of the vinylbenzyl trialkylammonium salt repeating unit.

8. The anion-exchange composite membrane according to claim 1, wherein the concentration of the polyvinyl halide polymer is 5~45 weight parts by 100 weight parts of the repeating unit mixture containing the vinylbenzyl trialkylammonium salt repeating unit, the styrene repeating unit and the divinylbenzene derived repeating unit.

9. The anion-exchange composite membrane according to claim 1, wherein the concentration of the olefin additive is 3~10 weight parts by 100 weight parts of the repeating unit mixture containing the vinylbenzyl trialkylammonium salt repeating unit, the styrene repeating unit and the divinylbenzene derived repeating unit.

10. The anion-exchange composite membrane according to claim 1, wherein the concentration of the plasticizer is 3~10 weight parts by 100 weight parts of the repeating unit mixture containing the vinylbenzyl trialkylammonium salt repeating unit, the styrene repeating unit and the divinylbenzene derived repeating unit.

11. A composite membrane module including the anion-exchange composite membrane of claim 1.

12. A preparation method of the anion-exchange composite membrane of claim 1 comprising the following steps:
impregnating a support in the form of a fabric in a polymerization solution comprising a vinylbenzyl halogen monomer, a styrene monomer, a divinylbenzene crosslinking agent, an initiator, an olefin additive, a plasticizer and a polyvinyl halide polymer (step 1);
preparing an intermediate membrane comprising a vinylbenzyl halogen-styrene copolymer produced by polymerizing the vinylbenzyl halogen monomer, the styrene monomer, and the divinylbenzene crosslinking agent included in the support impregnated in step 1; b) the olefin additive; c) the plasticizer; and d) the polyvinyl halide polymer (step 2); and
preparing an anion-exchange composite membrane by reacting the intermediate membrane of step 2 with a tertiary amine and introducing a quaternary ammonium group as an anion-exchangeable group (step 3).

13. The preparation method of the anion-exchange composite membrane according to claim 12, wherein the polymerization solution is prepared by adding the styrene monomer at the concentration of 25~85 weight parts and the divinylbenzene crosslinking agent at the concentration of 5~45 weight parts by 100 weight part of the vinylbenzyl halogen monomer, the olefin additive at the concentration of 1~10 weight parts by 100 weight parts of the monomer mixture of the vinylbenzyl halogen monomer, the styrene monomer and the divinylbenzene crosslinking agent, the plasticizer at the concentration of 3~12 weight parts by 100 weight parts of the monomer mixture of the vinylbenzyl halogen monomer, the styrene monomer and the divinylbenzene crosslinking agent, and the polyvinyl halide polymer at the concentration of 5~45 weight parts by 100 weight parts of the monomer mixture of the vinylbenzyl halogen monomer, the styrene monomer and the divinylbenzene crosslinking agent.

14. The preparation method of the anion-exchange composite membrane according to claim 12, wherein the vinylbenzyl halogen monomer includes a monomer is selected from the group consisting of vinylbenzyl chloride, vinylbenzyl bromide, vinylbenzyl iodide, and a combination thereof.

15. The preparation method of the anion-exchange composite membrane according to claim 12, wherein the polymerization in step 2 is performed at 50~100° C. for 6~24 hours.

16. The preparation method of the anion-exchange composite membrane according to claim 12, wherein the tertiary amine includes an amine selected from the group consisting of trimethylamine, triethylamine, diphenylethylamine, diethylphenylamine, and a combination thereof.

* * * * *